(12) United States Patent
Brammeier

(10) Patent No.: US 11,147,214 B2
(45) Date of Patent: Oct. 19, 2021

(54) COMBINE WITH A PRE-THRESHER

(71) Applicant: DEERE & COMPANY, Moline, IL (US)

(72) Inventor: Tyler S. Brammeier, East Moline, IL (US)

(73) Assignee: DEERE & COMPANY, Moline, IL (US)

( * ) Notice: Subject to any disclaimer, the term of this patent is extended or adjusted under 35 U.S.C. 154(b) by 226 days.

(21) Appl. No.: 16/453,005

(22) Filed: Jun. 26, 2019

(65) Prior Publication Data

US 2020/0404851 A1 Dec. 31, 2020

(51) Int. Cl.
*A01F 12/44* (2006.01)
*A01F 12/26* (2006.01)
*A01F 12/46* (2006.01)
*A01F 7/06* (2006.01)
*A01F 12/28* (2006.01)
*A01F 12/10* (2006.01)

(52) U.S. Cl.
CPC .............. *A01F 12/446* (2013.01); *A01F 7/06* (2013.01); *A01F 12/26* (2013.01); *A01F 12/46* (2013.01); *A01F 7/067* (2013.01); *A01F 12/10* (2013.01); *A01F 12/28* (2013.01); *A01F 12/442* (2013.01)

(58) Field of Classification Search
CPC .......... A01F 12/446; A01F 7/06; A01F 12/26; A01F 12/46; A01F 12/28; A01F 12/442; A01F 12/10; A01F 7/067; A01F 7/04; A01D 41/12; A01D 45/02
See application file for complete search history.

(56) References Cited

U.S. PATENT DOCUMENTS

| | | | | |
|---|---|---|---|---|
| 509,490 A | * | 11/1893 | Richter | A01F 12/28 460/109 |
| 682,193 A | * | 9/1901 | Heggem | A01F 12/00 460/113 |
| 740,215 A | * | 9/1903 | Bartholow | A01F 12/28 460/109 |

(Continued)

FOREIGN PATENT DOCUMENTS

| | | | | |
|---|---|---|---|---|
| DE | 2726031 A1 | * | 12/1977 | ........... A01F 12/184 |
| SU | 1124893 A1 | * | 11/1984 | ............. A01F 12/24 |
| WO | WO-9610327 A1 | * | 4/1996 | ........... A01F 12/185 |

*Primary Examiner* — Arpad Fabian-Kovacs
(74) *Attorney, Agent, or Firm* — Taft Stettinius & Hollister LLP; Stephen F. Rost

(57) ABSTRACT

A harvesting machine including a cutting head configured to provide cut crop for threshing. The harvesting machine includes a conveyer disposed adjacent to the cutting head and configured to move the cut crop to be threshed along a path. A thresher is configured to thresh the cut crop to provide threshed grain from the cut crop. A separator is disposed adjacently to the thresher and is configured to separate debris from the threshed grain. A feed accelerator is disposed between the conveyor and the thresher, wherein the feed accelerator is configured to advance the cut crop along the path from the conveyor to the thresher. A pre-threshing device is disposed adjacently to the feed accelerator, wherein the feed accelerator interacts with the pre-threshing device to provide threshed grain, and the pre-threshing device is configured to collect the threshed grain before the remaining cut crop is threshed at the thresher.

19 Claims, 7 Drawing Sheets

(56) References Cited

U.S. PATENT DOCUMENTS

| | | | | |
|---|---|---|---|---|
| 1,095,693 A * | 5/1914 | Anderson | A01F 12/28 | 460/109 |
| 1,820,055 A * | 8/1931 | Divoky | A01F 12/446 | 460/101 |
| 1,857,265 A * | 5/1932 | Stephens | A01F 12/28 | 460/109 |
| 2,484,228 A * | 10/1949 | Isay | B02B 3/00 | 460/46 |
| 2,794,438 A * | 6/1957 | Heth | A01F 12/24 | 460/109 |
| 2,923,409 A * | 2/1960 | Yonash | A01F 12/446 | 209/394 |
| 3,547,129 A * | 12/1970 | Hirsch | A01F 12/24 | 460/109 |
| 3,648,709 A * | 3/1972 | De Coene | A01F 12/10 | 460/106 |
| 3,974,837 A * | 8/1976 | Applegate | A01F 12/28 | 460/105 |
| 4,165,751 A * | 8/1979 | Todd | A01F 12/28 | 460/73 |
| 4,314,571 A * | 2/1982 | DeBusscher | A01F 12/442 | 460/99 |
| 4,378,024 A * | 3/1983 | De Busscher | A01F 12/442 | 460/73 |
| 4,399,825 A * | 8/1983 | Raineri | A01F 12/18 | 460/109 |
| 4,875,891 A * | 10/1989 | Turner | A01F 12/24 | 460/110 |
| 5,057,056 A * | 10/1991 | Kambeitz | A01F 12/24 | 460/110 |
| 5,078,646 A | 1/1992 | Claas et al. | | |
| 5,152,717 A * | 10/1992 | Nelson | A01F 12/442 | 460/110 |
| 5,334,093 A * | 8/1994 | Jensen | A01F 12/442 | 460/107 |
| 5,342,239 A * | 8/1994 | West | A01F 12/22 | 460/110 |
| 5,445,563 A | 8/1995 | Stickler et al. | | |
| 5,466,188 A * | 11/1995 | Schaal | A01D 45/06 | 460/24 |
| 5,556,337 A * | 9/1996 | Tophinke | A01F 7/06 | 460/70 |
| 5,733,192 A * | 3/1998 | Jones | A01F 12/22 | 460/106 |
| 6,247,296 B1 * | 6/2001 | Becker | A01D 41/142 | 460/20 |
| 6,290,599 B1 * | 9/2001 | Eis | A01F 12/28 | 460/109 |
| 8,062,109 B1 * | 11/2011 | Pearson | A01D 41/1252 | 460/59 |
| 8,109,815 B2 * | 2/2012 | Hollatz | A01F 7/067 | 460/70 |
| 8,118,652 B2 * | 2/2012 | Hollatz | A01F 12/10 | 460/113 |
| 9,456,550 B2 | 10/2016 | Suen et al. | | |
| 2002/0103015 A1 * | 8/2002 | Gerber | A01F 12/10 | 460/112 |
| 2004/0224737 A1 * | 11/2004 | Esken | A01F 12/28 | 460/109 |
| 2005/0009591 A1 * | 1/2005 | Duquesne | A01F 12/28 | 460/107 |
| 2010/0173684 A1 * | 7/2010 | Hollatz | A01F 12/10 | 460/70 |
| 2010/0173685 A1 * | 7/2010 | Hollatz | A01F 7/06 | 460/73 |
| 2011/0151950 A1 * | 6/2011 | Regier | A01F 12/26 | 460/69 |
| 2011/0151951 A1 * | 6/2011 | Regier | A01F 12/26 | 460/109 |
| 2012/0100898 A1 * | 4/2012 | Mygind | A01F 12/10 | 460/22 |
| 2014/0308998 A1 * | 10/2014 | Bergkamp | A01F 12/28 | 460/107 |
| 2015/0237805 A1 * | 8/2015 | Suen | A01F 12/22 | 460/16 |
| 2018/0084728 A1 * | 3/2018 | Regier | A01F 12/20 | |
| 2019/0166767 A1 * | 6/2019 | Robertson | A01F 12/185 | |

\* cited by examiner

COMBINE WITH A PRE-THRESHER

FIELD OF THE DISCLOSURE

The present disclosure relates to a harvesting machine, and more particularly to a thresher of the harvesting machine to thresh crop.

BACKGROUND

Combine harvesters are used in agriculture for harvesting crops which are gathered from the field, threshed-out, and separated. The crops obtained by threshing are subsequently separated from undesired crop residues by a cleaning process. The threshing process removes the grain, typically a kernel, from the supporting stalk of the plant. In the case of wheat, a kernel of wheat is removed from the wheat stalk and the hull or husk is removed from the kernel. In the case of corn, a corn husk is removed from the corn and the kernels of corn are removed from the cob, once the corn husk has been removed.

The threshing process typically includes directing the cut crop to a thresher having a gap located between a rotor and a concave, in the form of a fixed wire grate or similar. The rotor rotates with respect to the fixed grate and a sufficient amount of cut crop is forced into the gap such the rotor engages the crop to remove the kernels from the cut crop. Once removed, the kernels fall through the concave to a collector that collects the grain.

After threshing, a separation process is performed. In the separation process, the rear portion of the rotor with a different configuration than the front rotates with respect to a fixed grate wherein lighter particles, such as chaff, broken parts of the stalk, leaves, and other plant materials are separated from any remaining grain. Grain and other plant material fall through the fixed grate onto one or more sieves. The cleaning process includes a blower, which acts on sieves that move back and forth. A part of the cleaning process, resulting from the air being moved by the blower, separates the lighter particles from the grain and the grain falls through the sieves where it taken to a grain tank. Many combine harvesters utilize an upper sieve placed above a lower sieve.

Different types of combines are manufactured and perform the threshing and separating process. In an axial combine, for instance, the threshing is done by the forward part of the rotor and the concaves, and the separating is done by the rear part of the rotor and the grates. In a conventional or hybrid machine, the threshing is done by a lateral drum with concaves, while the separating is accomplished by walkers or rotors with grates.

The axial combine, the conventional combine, and the hybrid combine, each perform the process of threshing and separating but use different types of mechanisms to do so. In each type of machine, however, a certain amount of grain is not recovered from the cut stalk due to the unpredictable nature of the cut crop and inefficiencies in the combines. For instance, if too much cut crop is fed to the thresher, a certain amount of grain is not removed from the cut crop and is therefore wasted. In some systems, the transitional gaps, between each of different stages of crop flow and grain removal, result in inefficiencies where grain removal can be incomplete. What is needed, therefore, is a combine that provides a threshing operation to remove and capture a greater amount of grain than is currently provided by known combines.

SUMMARY

In one embodiment, there is provided a pre-threshing system for threshing and collecting grain from cut crop. The pre-threshing system includes a feed accelerator and a pre-threshing device disposed adjacent to the feed accelerator. The feed accelerator moves with respect to the pre-threshing device to move cut crop along a path and across the pre-threshing device. The feed accelerator interacts with the pre-threshing device to provide threshed grain, wherein the pre-threshing device is configured to collect the threshed grain.

In another embodiment, there is provided a harvesting machine including a cutting head configured to provide cut crop for threshing. The harvesting machine includes a conveyer disposed adjacent to the cutting head that is configured to move the cut crop along a path to be threshed. A thresher is configured to thresh the cut crop to provide threshed grain from the cut crop. A separator is disposed adjacently to the thresher and is configured to separate debris from the threshed grain. A feed accelerator is disposed between the conveyor and the thresher, wherein the feed accelerator is configured to advance the cut crop along the path from the conveyor to the thresher. A pre-threshing device is disposed adjacently to the feed accelerator, wherein the feed accelerator moves with respect to the pre-threshing device to move cut crop across the pre-threshing device. The feed accelerator interacts with the pre-threshing device to provide threshed grain, and the pre-threshing device is configured to collect the threshed grain.

In a further embodiment, there is provided a method of harvesting grain with a harvesting machine having a cutting head configured to provide cut crop for threshing. The method includes: moving the cut crop along a path; accelerating the cut crop along the path with a feed accelerator; pre-threshing the cut crop at a gap between the feed accelerator and a pre-threshing device to obtain a first quantity of threshed grain; moving the cut crop to a thresher to continue threshing of the cut crop after pre-threshing the cut crop to obtain a second quantity of threshed grain; and separating debris from the first and second quantity of threshed grain.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
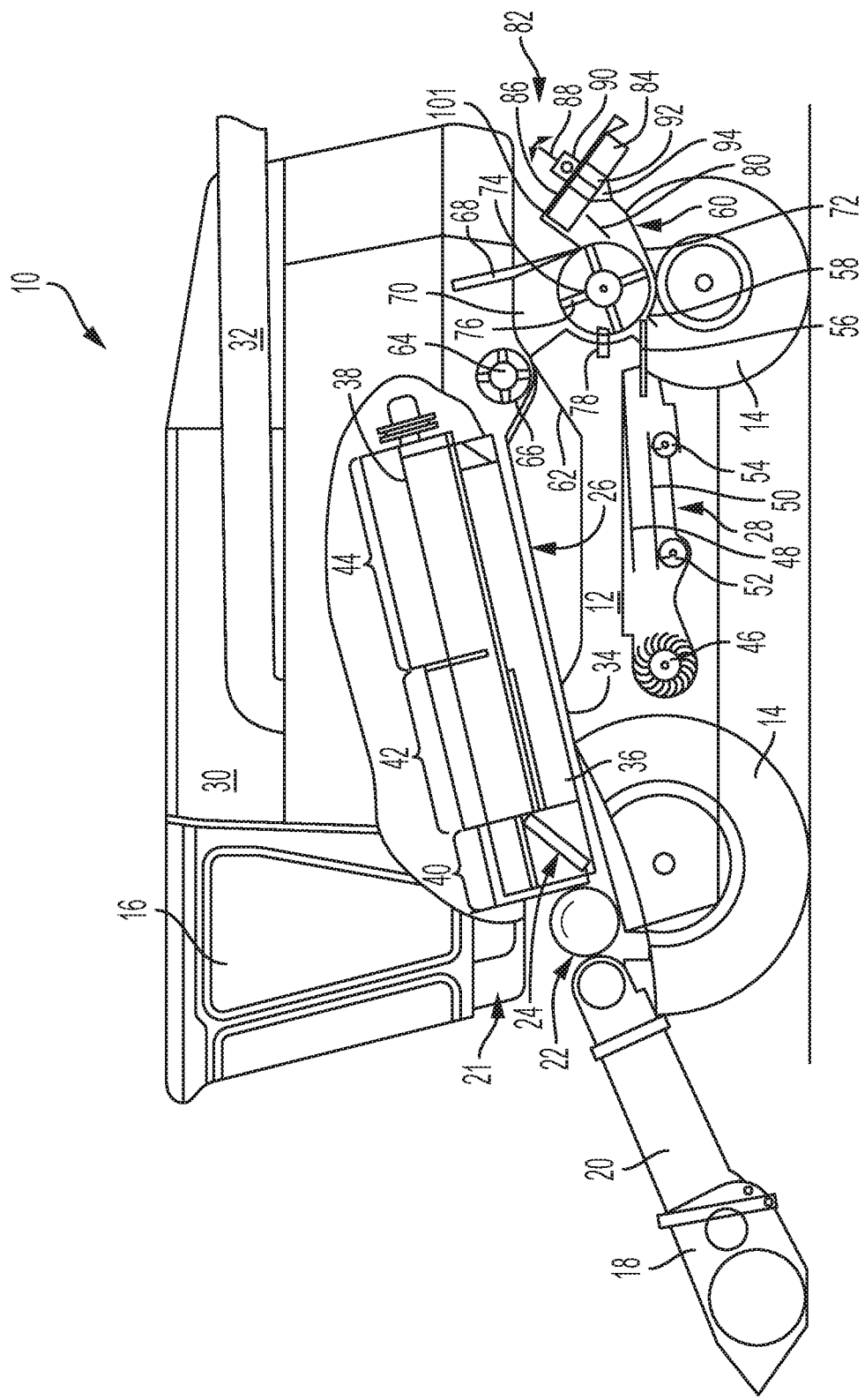
FIG. 1 is a side view of a harvesting machine.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In FIG. 1, an embodiment of a harvesting machine or agricultural combine 10 is shown with a chassis or frame 12 with one or more ground engaging mechanisms such as wheels 14 that are in contact with the underlying surface or ground. Wheels 14 are coupled to the frame 12 and are used for moving the combine 10 in a forward operating or travelling direction. The forward operating direction is to the left in FIG. 1. The operation of the combine 10 is controlled from an operator's cab 16. The operator's cab 16 may include any number of controls (not shown) for controlling the operation of the combine 10. A cutting head 18 is disposed at a forward end of the combine 10 and is used to harvest crop such as corn or wheat and to conduct it to a slope conveyor 20. The harvested crop is processed by a threshing/separating apparatus 21 including a guide drum 22, also known as a feed accelerator, from the slope conveyor 20, to move the cut crop from the slope conveyor. The guide drum 22 guides the harvested crop through an inlet transition section 24 to an axial harvested crop processing arrangement 26, as shown in FIG. 1, both of which are including in the threshing/separating apparatus 21. A clean crop routing assembly 28 is disposed adjacent to the crop processing arrangement 26.

The harvested crop processing arrangement 26 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 26. In place of the axial harvested crop processing unit 26, a tangential threshing drum with a following axial threshing section or a straw chopper could also be used.

Corn, chaff, and the like that fall through a thresher basket associated with the threshing section 42 and through a separating grate associated with the separating section 44 may be directed to the clean crop routing assembly 28 with a blower 46 and sieves 48, 50 with louvers. The sieves 48, 50 can be oscillated in a fore-and-aft direction. The clean crop routing assembly 28 removes the chaff and guides the cleaned grain over a screw conveyor 52 to an elevator for clean grain (not shown). The elevator for clean grain deposits the clean grain in a grain tank 30, as shown in FIG. 1. The clean grain in the corn tank 30 can be unloaded by means of an unloading screw conveyor 32 to a grain wagon, trailer, or truck (not shown). Harvested crop remaining at the lower end of the lower sieve 50 is again transported to the harvested crop processing arrangement 26 by a screw conveyor 54 and an overhead conveyor (not shown). The harvested crop residue delivered at the upper end of the upper sieve 48, that consists essentially of chaff and small straw particles, is conveyed by means of an oscillating sheet conveyor 56 to the rear and to a lower inlet 58 of a crop debris routing assembly 60.

The aforementioned blower 46 produces an air flow that carries much of the chaff and small particles to the rear of the combine and to the crop debris routing assembly 60. The blower 46 is capable of providing three or more air paths inside the combine. A first air or flow path may be through a front portion of the combine 10. A second air or flow path may be above the lower sieve 50 and below the upper sieve 48 or chaffer. A third air or flow path may be below the lower sieve 50. All three air or flow paths fill the combine body and can create pressurized air flow to pick up and carry straw, grain, and other residue or particles to the rear of the combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath it to eject the straw to the rear, and the grain and material other than grain (MOG) is directed through the clean crop routing assembly 28. A wall 68 is located to the rear of the ejection drum 64. The wall 68 guides the straw into an upper inlet 70 of the crop debris routing assembly 60.

The crop debris routing assembly 60 may include a housing 72 (i.e., chopper housing) with a rotor 74 arranged therein that can rotate in a counterclockwise direction about an axis extending horizontally and transverse to the direction of operation. The rotor 74 may include a plurality of chopper knives 76, pendulously suspended in pairs and distributed around the circumference of the rotor 74, that interact with opposing knives 78, which are fixed to the housing 72. Two impeller blowers 82 arranged side by side alongside each other, may be provided downstream of an outlet 80 of the crop debris routing assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84 that extend radially can be rotatably driven by a hydraulic motor 90 that is attached above a bottom sheet 101 which is connected with the housing 72 of the crop debris routing assembly 60. At their radially inner ends the impeller blades 84 are connected to a cylindrical central body 92 that transitions into a cone 94 with a point on its end facing away from the disk 86. The impeller blades 84 may be rectangular and the height of the body 92 (without cone 94) may be equal to the height of the impeller blades 84. The cross section of the body 92 and the cone 94 may be circular, although it could also have a multifaceted shape.

Figure 2:
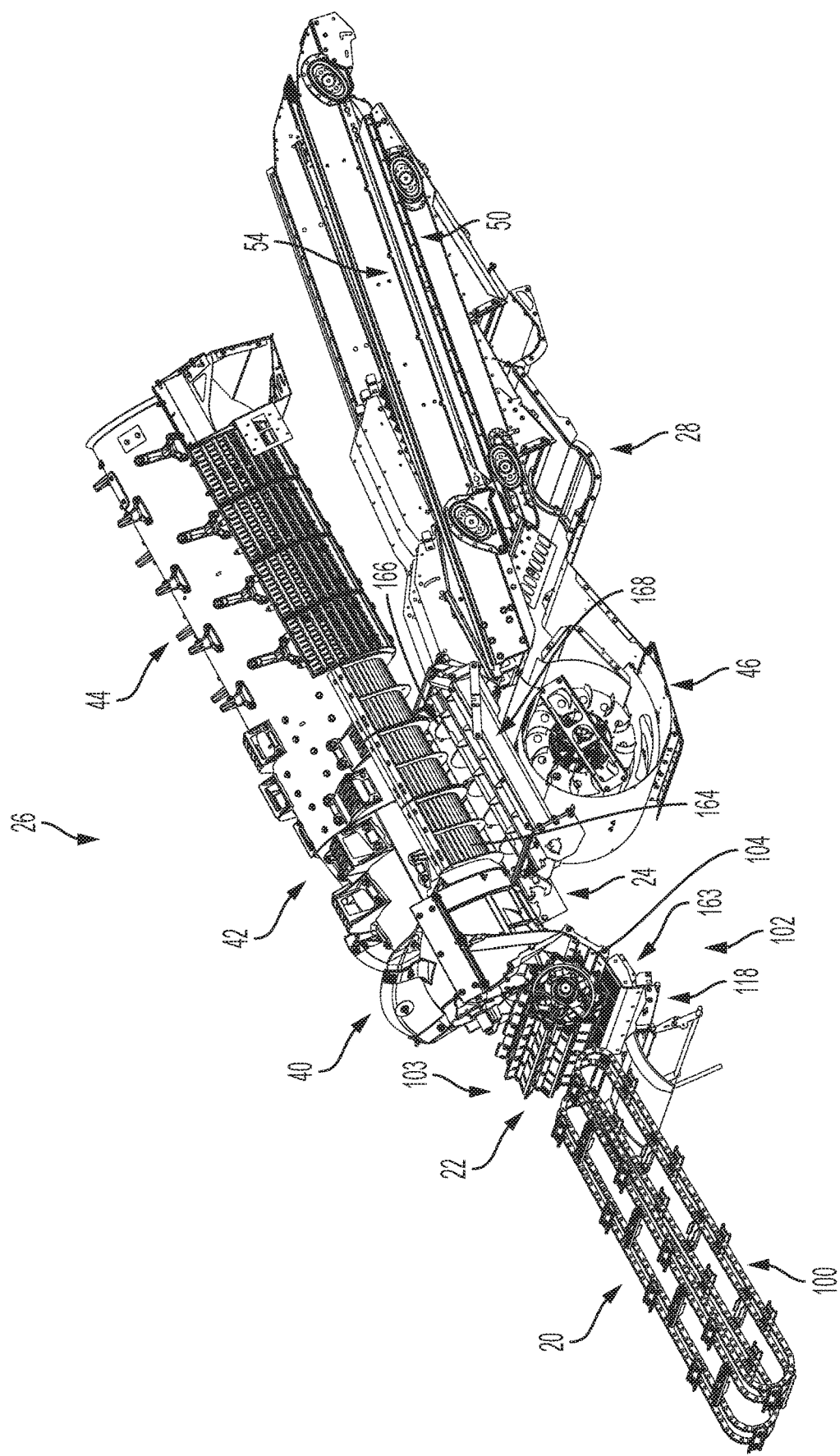
FIG. 2 is a perspective view of a threshing/separating apparatus.

FIG. 2 illustrates a perspective view of the threshing/separating apparatus 21 including the feed accelerator 22, the inlet transition section 24, the processing arrangement 26, and the clean crop routing assembly 28. The slope conveyor 20 includes a feederhouse chain 100 that rotates in a counterclockwise direction as illustrated to move cut crop from the cutting head 18 to the feed accelerator 22. The feed accelerator 22 rotates in a counterclockwise direction as illustrated to move the cut crop from the feederhouse chain 100 to the inlet transition section 24. In one embodiment, the inlet transition section 24 (i.e. the charging section 40), is a feed casting which funnels the cut crop moved by the feed accelerator 22 into the threshing section 42.

Disposed beneath the feed accelerator 22 is a pre-threshing device 102 that is configured to collect grain that is threshed by the feed accelerator as it rotates with respect to the pre-threshing device 102. The feed accelerator 22 and the pre-threshing device cooperate as a pre-threshing system or apparatus 103 to begin a threshing process that is continued by the threshing section 42 and the separating section 44. By pre-threshing the cut crop at the pre-threshing system 103, a certain amount of grain is released from the cut crop, i.e. threshed grain, to reduce the amount of grain that is to be threshed by the threshing section 42. In one embodiment, the pre-threshing system 103 captures approximately 5-15 percent of total amount of grain to be threshed and boosts the capacity of threshing in addition to the threshing occurring in front of the rotor 36. By pre-threshing, the threshing section 42 receives cut crop having a lesser amount of grain and improves the threshing process since the previously threshed grain, threshed at the pre-threshing device 102, is not present. The effectiveness of the threshing section 42 is more efficient as the previously threshed grain does not obstruct the threshing operation of threshing section 42. In contrast, if the feed accelerator 22 were disposed above a support surface, such as a continuous piece of sheet metal, some grain that is necessarily released during the acceleration of the feed crop would be lost.

As crop moves from the feederhouse chain 100 along a flow path, the crop enters a gap 104 defined between a top portion of the pre-threshing device 102 and the feed accelerator 22. As the feed accelerator 22 rotates with respect to the pre-threshing device 102, some of the kernels of grain are separated from the cut crop and fall to a screen structure 106 located at the top portion of the pre-threshing device 102. In different embodiments, the screen structure 106 includes, but is not limited to, a grate, a sieve, a mesh of wire or plastic, a perforated material, or a plurality of spaced bars.

Figure 3:
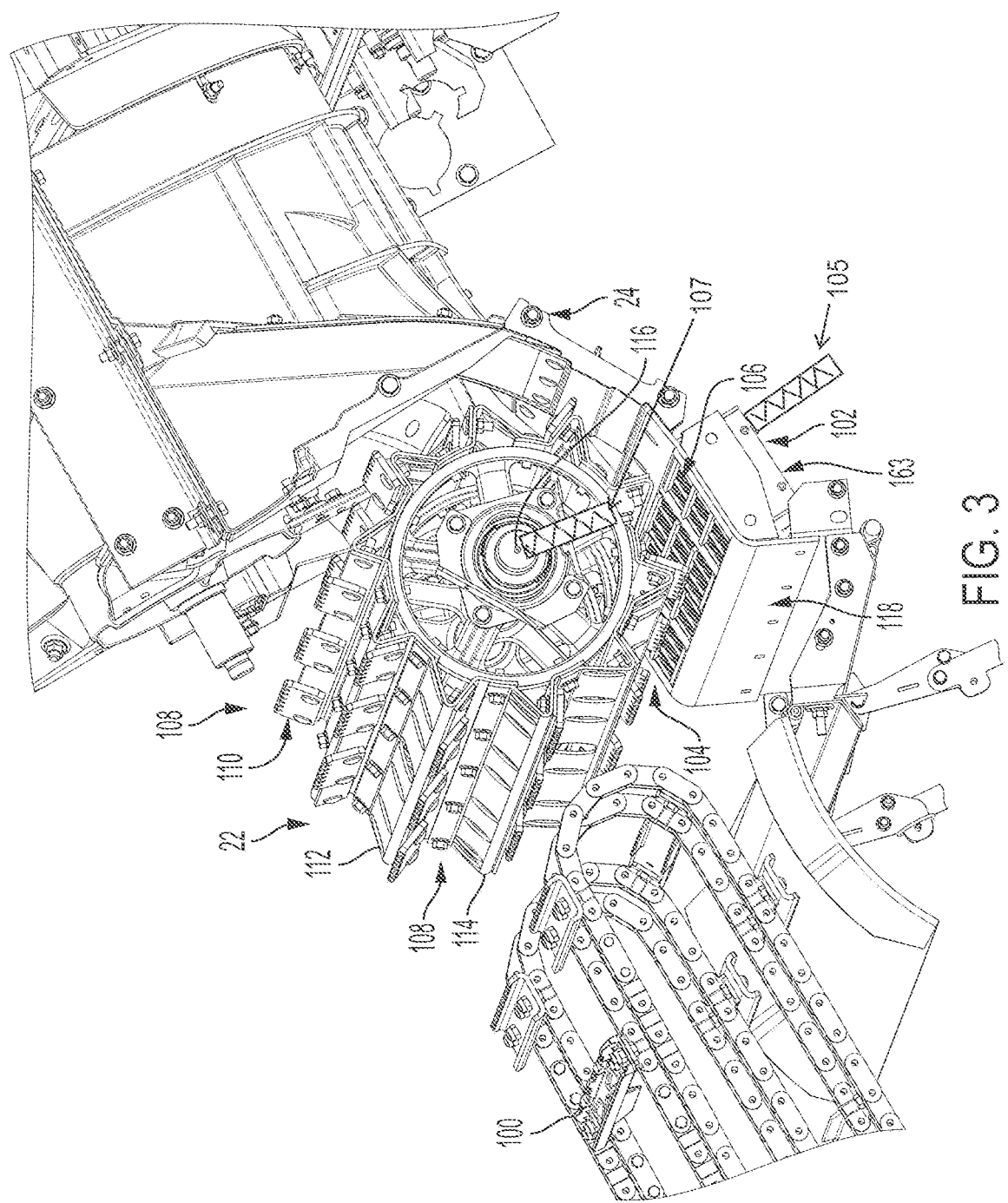
FIG. 3 is a perspective view of portion of the threshing/separating apparatus of FIG. 2 including a pre-threshing system.

As illustrated in FIG. 3, the feed accelerator 22 includes a plurality of crop engaging members 108 having a plurality of paddles 110 and an inclined side 112. The plurality of crop engaging members 108 are fixedly connected to a cylinder 114 that rotates about a rotational axis 116. The paddles 110 form a leading edge of the feed accelerator 22 and engage the moving cut crop as it moves through the gap 104. The angled side 112 forms a trailing edge of the crop engaging members 108. As the crop engaging member 108 contacts the cut crop located in the gap 104, some of the kernels of grain are freed from the stalks and are collected by the screen structure 106.

One or both of the pre-threshing device 102 and the feed accelerator 22 are resiliently coupled to support structure such that the gap 104 expands or contracts based on the amount of cut crop moving through the gap. Springs 105 and 107 could be located on each individual sections while hydraulics/electric actuator could "float" the whole structure. In another embodiment, the operator's cab 16 includes a user control (not shown) to enable the operator to manually adjust a size of the gap 104 in which an actuator is operatively connected to one or both of the pre-threshing device 102 or the rotor 36 for movement thereof. In addition, another embodiment includes an automatic adjustment mechanism to adjust the size of the gap automatically to a predetermined size, for instance based on the type of crops being processed. In still another embodiment, the size of the gap is determined based on crop pressure sensed by one or more sensors located at supporting structures or actuating structures for the rotor 36 or the pre-threshing device 102.

A trap 118 is located in the flow path of the cut crop after the feederhouse chain 100 and before the pre-threshing device 102. The trap 118 is configured to collect larger debris, including rocks, that are present in the cut crop. As the cut crop moves across the trap 118, the debris, if heavy enough, falls into the trap 118. In addition, as the feed accelerator 22 rotates, some of the debris is picked up by the crop engaging members 108 and falls into the trap 118 during rotation of the feed accelerator 22. The collected debris located in the trap 118 is removed as necessary.

Figure 4:
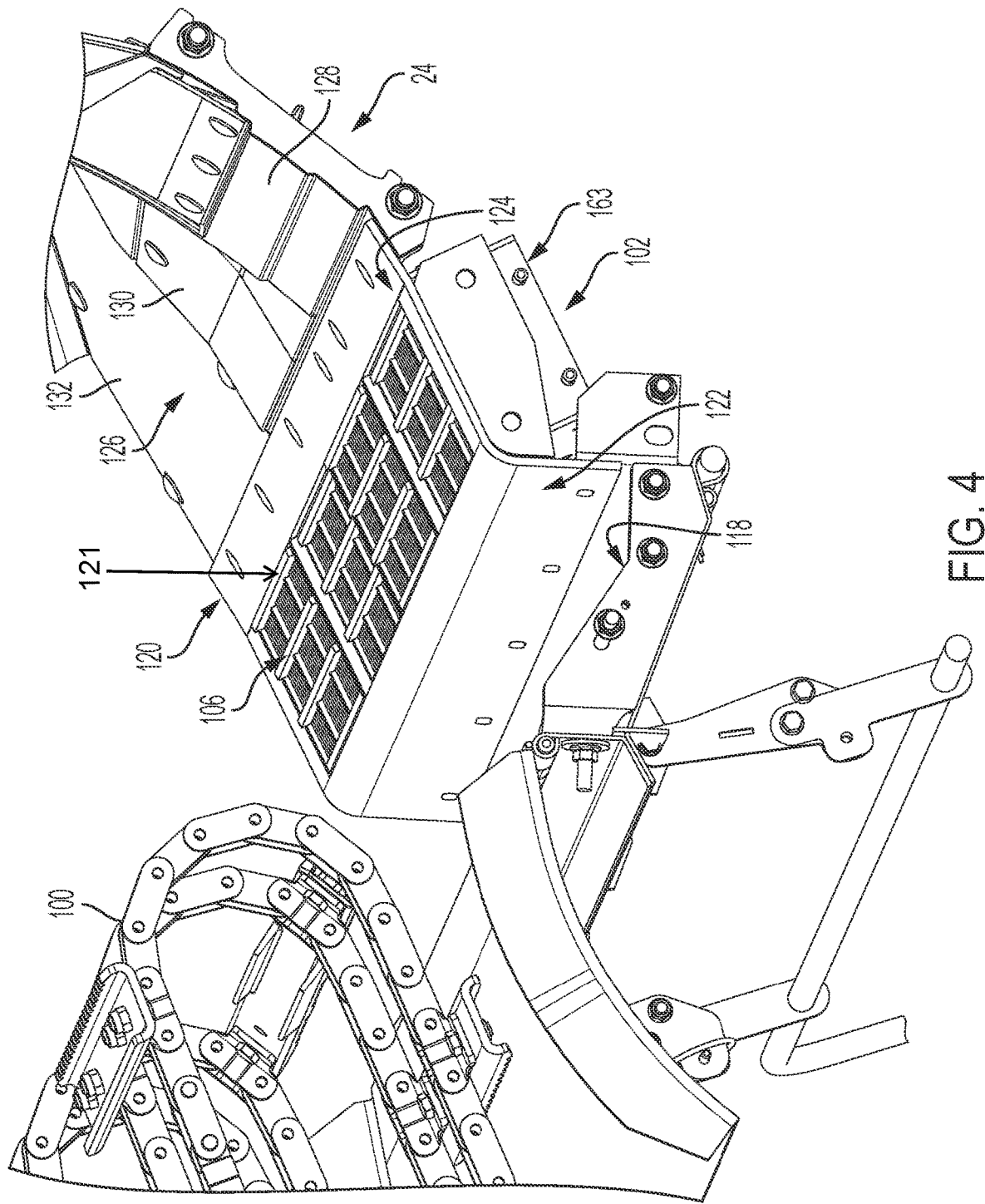
FIG. 4 is a perspective view of a pre-threshing device of the pre-threshing system disposed at the end of a conveyor

FIG. 4 illustrates the pre-threshing device 102, but does not illustrate the feed accelerator 22. The pre-threshing device 102 includes a frame 120 that includes a window 121 surrounding the screen structure 106. (See also FIG. 5) The frame 120 includes a leading lip 122 and a trailing lip 124. The leading lip 122 is configured to direct debris downwardly toward the debris trap 118 and forwardly to the gap 104 defined between the feed accelerator 22 and the screen structure 106. The leading lip 122 spans a gap between the debris trap 118 and the screen structure 106 to capture the debris. The trailing lip 124 is configured to direct the cut crop moving across the screen structure 106 to the inlet transition section 24. The trailing lip 124 is located downstream of the leading lip 122. The trailing lip 124 is operatively connected between the screen structure 106 and the transition section 24 to direct the cut crop into an inlet 126 of the inlet transition section 24. The inlet 126 includes a first section 128 disposed adjacently to a second section 130 which is disposed adjacently to a third section 132. Each of the sections 128, 130 and 132 includes different slopes such that cut crop is directed toward the third section 132. By directing crop toward the third section 132, the cut grain is funneled to the threshing section 42.

Figure 5:
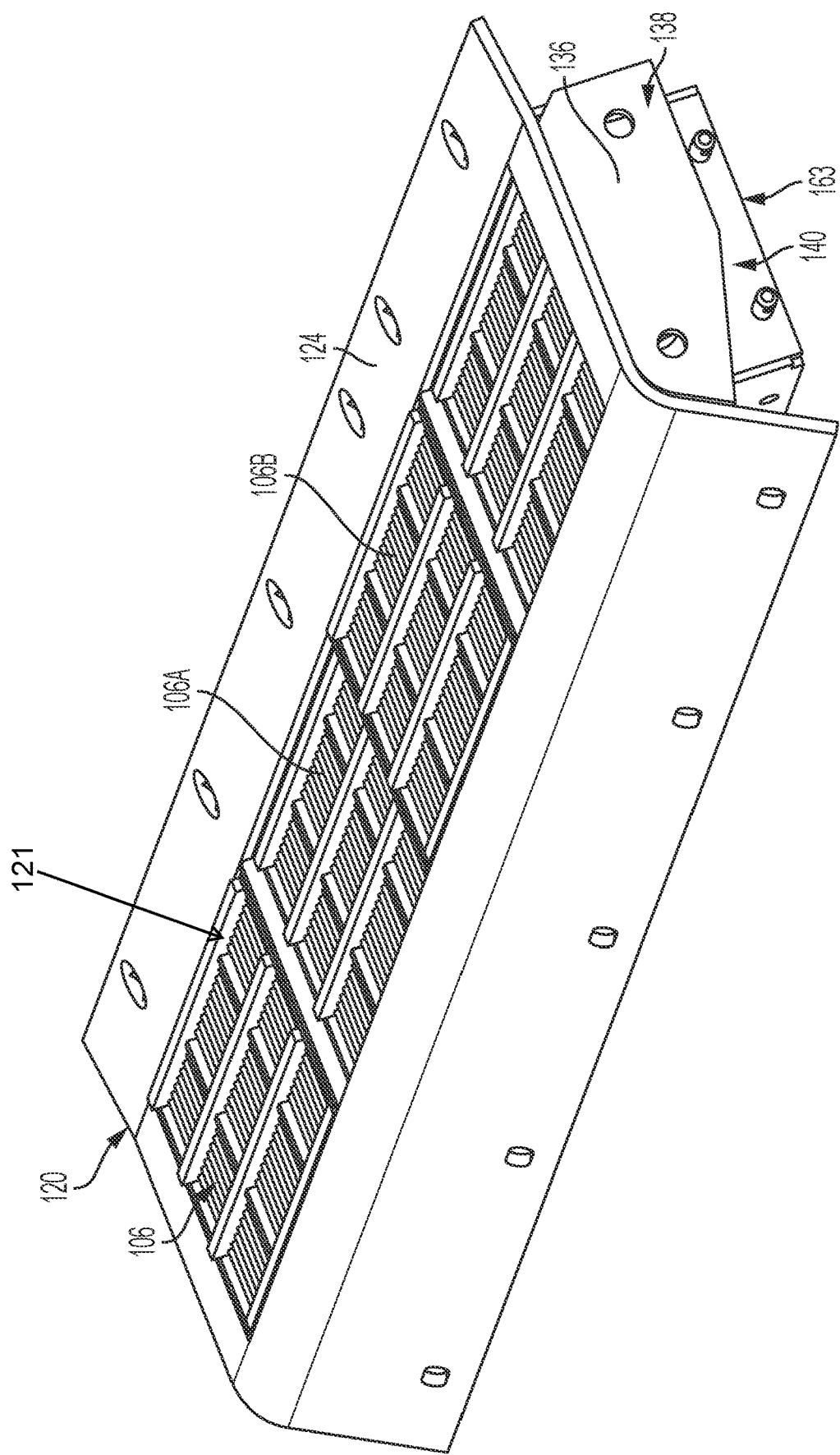
FIG. 5 is a perspective view of a pre-threshing device including a screen and a window.

As seen more particularly in FIG. 5, the frame 120 is supported by frame side panels 136 configured to support the frame 120. The frame 120 and side panels 136 are configured to form a frame structure 138 which is operatively connected to a screen support structure 140 that supports the screen structures 106. In an exemplary embodiment as illustrated in FIG. 5, adjacent screen structures 106 are offset in height. For instance, screen structure 106A is located on a different plane than adjacent screen structure 106B. The screen structure 106A is therefore spaced at a greater distance from the leading edge of the paddles 110 than the screen structure 106B is spaced. By staggering the height of the screen structures 106, the surface engaged by the cut crop is varied and provides for more complete threshing of grain. In different embodiments, the threshing section include a number of sections located at different heights relative to one another. In other embodiments, the screen structures are not staggered. Also while the screen structures 106 are illustrated as being generally rectangular, other configurations are contemplated. Furthermore, fewer or greater screen structures are contemplated. Contoured screen structures, other than planar, are also contemplated. The threshing screens in different embodiments include bars, square stock, and perforated sheet metal. Other types of threshing screens are contemplated.

Figure 6:
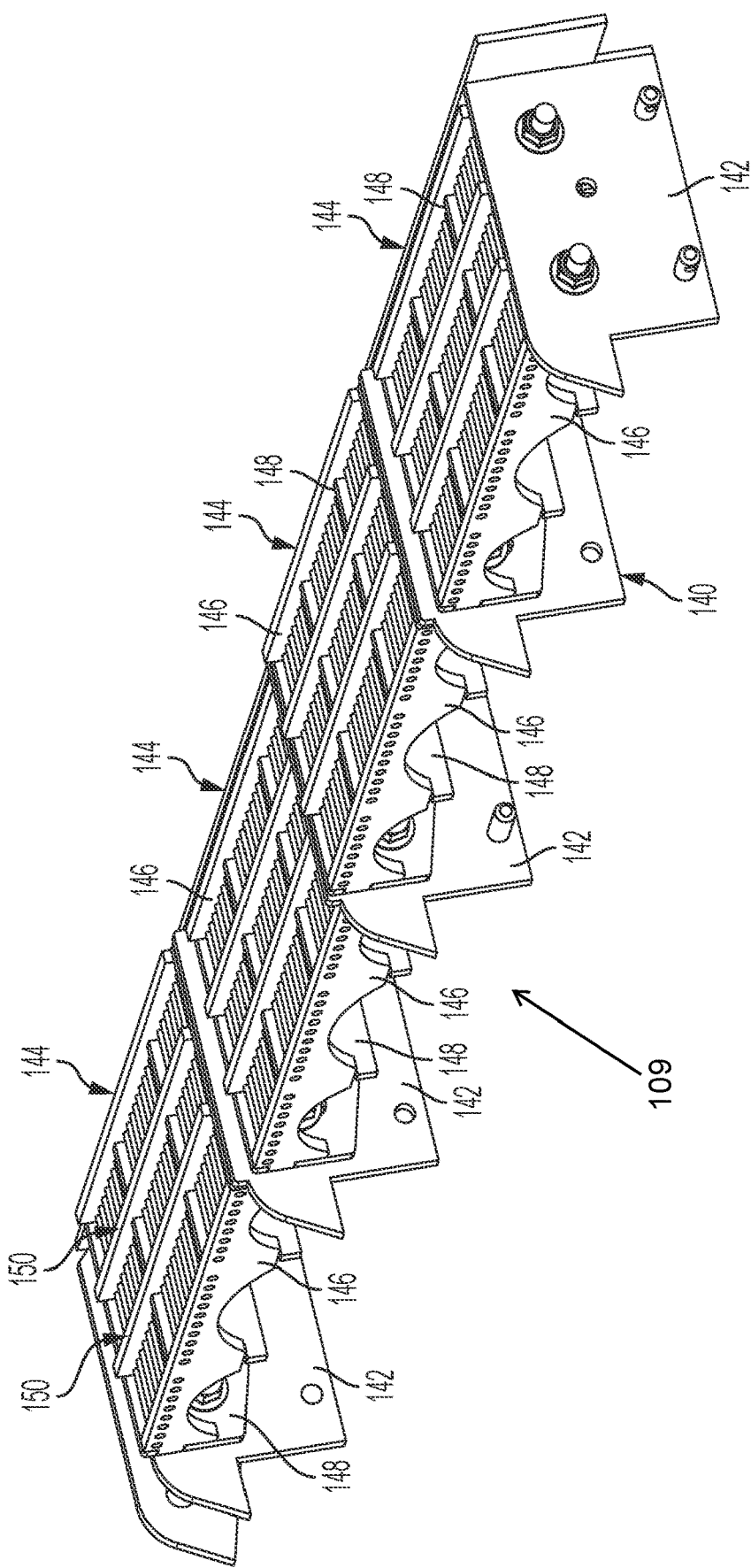
FIG. 6 is perspective view of a portion of a pre-threshing device.

The screen support structure 140, as further illustrated in FIG. 6, includes a plurality of support sidewalls 142 each of which is operatively connected to a screen panel 144. Each of the screen panels 144 includes supports 146 which extend generally perpendicular to the flow of crop and which are operatively connected to sidewalls 142. The supports 146 are operatively connected to screen panel supports 148. In one embodiment as illustrated, the supports 146 are scalloped to reduce the weight of the pre-threshing device 102. In other embodiments, the supports 146 are not scalloped and other configurations are contemplated.

Figure 7:
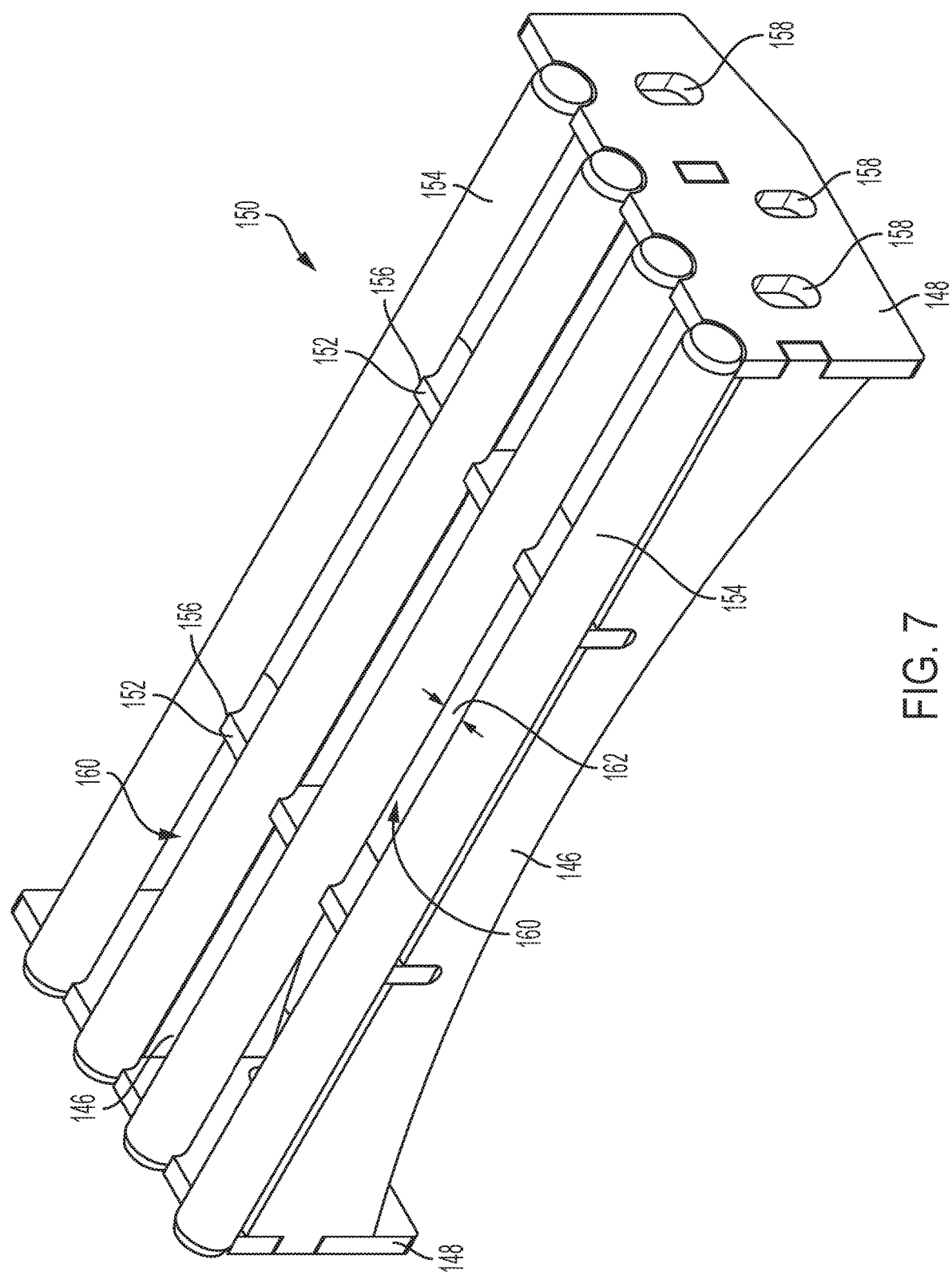
FIG. 7 is a screen unit of the pre-threshing device.

As seen in FIG. 6, each of the screen panels 144 includes nine (9) screen panel units 150, one of which is illustrated in FIG. 7. The supports 146 extend between the screen panel supports 148 and include notches configured to receive an intermediate support 152. The supports 146, the supports 148, and the supports 152 provide a support structure for a plurality of rods 154 that extend from the supports 148 and which engage supports 152. Each of the rods 154 includes rod notches 156 configured to receive one of the supports 152. The screen panel units 150 are connected to adjacent screen panel units at adjacent screen panel supports 148 that include apertures 158. Each of the apertures 158 is configured to line up with adjacent apertures and to accept a connector extending through both apertures. In one embodiment, the connector is a bolt and a nut (not shown). Other types of connectors are contemplated.

Each of the rods 154 is spaced from an adjacent rod 154 to define an opening 160, which in the illustrated embodiment is a slot. The opening 160 includes a width 162 having a dimension configured to enable kernels of grain to fall between the slots. As seen in FIG. 6, the pre-threshing device 102 defines a generally open chamber 109 having an open end 163 (See FIGS. 4 and 5) which directs the grain to a receptacle (not shown). As seen in FIG. 2, the threshing section 42 includes a concave grate 164, also known as concaves, which directs the threshed grain to an auger 166 which further directs the threshed grain to a shaker pan 168 as understood by one of skilled in the art. The threshed grain after falling through the pre-threshing concaves, is moved by a belt, a shaking pan, an auger or other transport device toward the harvesting machines cleaning system, such as the clean crop routing assembly 28, and to the pre-cleaner, chaffer, sieve, clean grain auger and tailings.

While not specifically shown in FIG. 2, in one embodiment the open end 163 is operatively connected to the shaker pan 168, such that the grain captured at the pre-threshing device 102 is further cleaned and moved to the final collection location. Other embodiments include conveyor(s), belt(s), auger(s), or tube(s) to convey the material to the step pan, sieve(s), or grain auger.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

What is claimed is:

1. A pre-threshing apparatus for pre-threshing and collecting grain from cut crop, the cut crop being moved along a flow path by a feederhouse chain of a slope conveyor to a thresher for threshing the cut crop, the pre-threshing apparatus including:
    a feed accelerator receiving cut crop from the feederhouse chain and moving the cut crop along the flow path from the feederhouse chain toward the thresher;
    a debris trap located before the feed accelerator along the flow path, the debris trap collecting debris falling from the cut crop moving from the feederhouse chain to the feed accelerator;
    a pre-threshing device, including a screen, the pre-threshing device disposed beneath the feed accelerator, wherein the feed accelerator rotates with respect to the pre-threshing device to move cut crop along the flow path, across the pre-threshing device, and between the feed accelerator and the pre-threshing device, wherein the feed accelerator interacts with the pre-threshing device to pre-thresh the cut crop, and the pre-threshing device is configured to collect the pre-threshed grain, wherein the feed accelerator includes a plurality of crop engaging members each having a leading edge, wherein a distance between the leading edge and the screen defines a gap through which the cut crop moves between the feed accelerator and the pre-threshing device and wherein at least one of the feed accelerator and the pre-threshing device is resiliently biased by a resilient coupler such that the gap changes based on an amount of cut crop moving through the gap.

2. The pre-threshing apparatus of claim 1 wherein the pre-threshing device includes a chamber configured to collect the pre-threshed grain and the screen includes apertures configured to direct the pre-threshed grain to the chamber.

3. The pre-threshing apparatus of claim 2 further comprising a frame defining a window configured to expose the screen to the cut crop moving between the feed accelerator and the pre-threshing device.

4. The pre-threshing apparatus of claim 3 further comprising a frame structure configured to support the frame and to define the chamber, the chamber having an open end configured to direct the pre-threshed grain to a receptacle.

5. The pre-threshing apparatus of claim 4 wherein the frame includes a leading lip and a trailing lip, wherein the leading lip is located along the flow path at a first position and the trailing lip is located along the flow path at a second position, wherein the second position is located downstream of the first position.

6. The pre-threshing apparatus of claim 5 wherein the leading lip is inclined with respect to the screen and is configured to direct debris downwardly toward the debris trap.

7. The pre-threshing apparatus of claim 6 wherein the screen includes a plurality of screen panel units, wherein each of the screen structures includes a plurality of rods defining a plurality of apertures having a size sufficient to enable grain to pass therethrough.

8. The pre-threshing apparatus of claim 2 wherein the pre-threshing device further comprises a screen support structure supporting the screen and the screen includes a plurality of screen structures, wherein adjacent screen structures are offset in height along a dimension generally perpendicular to the flow path, such that the adjacent screen structures are located on different planes.

9. The pre-threshing apparatus of claim 8 wherein the crop engaging members includes a plurality of paddles forming the leading edge, wherein two or more of the plurality of screen structures are located on different planes, such that the height of the screen structures is varied with respect to the leading edge to provide a more complete pre-threshing of grain.

10. The pre-threshing apparatus of claim 1 further comprising a frame supporting the screen, the frame including a leading lip extending to the debris trap to direct debris toward the debris trap.

11. A harvesting machine including a cutting head configured to provide cut crop for threshing, the harvesting machine comprising:
    a conveyer disposed adjacent to the cutting head and configured to move the cut crop to be threshed along a path;
    a thresher configured to thresh the cut crop to provide threshed grain from the cut crop;
    a separator disposed adjacently to the thresher and configured to separate debris from the threshed grain;

a feed accelerator disposed between the conveyor and the thresher, the feed accelerator configured to advance the cut crop along the path from the conveyor to the thresher; and a debris trap located before the feed accelerator and after the conveyor, the debris trap collecting debris falling from the cut crop moving from the conveyer to the feed accelerator; and a pre-threshing device, including a screen, the pre-threshing device disposed beneath the feed accelerator, wherein the feed accelerator moves with respect to the pre-threshing device to move cut crop across the pre-threshing device, wherein the feed accelerator interacts with the pre-threshing device to pre-thresh the cut crop, and the pre-threshing device is configured to collect pre-threshed grain, wherein the feed accelerator includes a plurality of crop engaging members each having a leading edge, wherein a distance between the leading edge and the screen defines a gap through which the cut crop moves between the feed accelerator and the pre-threshing device and wherein at least one of the feed accelerator and the pre-threshing device are resiliently biased by a resilient coupler such that the gap changes based on an amount of cut crop moving through the gap.

12. The harvesting machine of claim 11 wherein the pre-threshing device includes a chamber configured to collect the pre-threshed grain and the screen having apertures configured to direct the pre-threshed grain to the chamber, and further wherein the thresher includes a concave configured to direct the pre-threshed grain to one or more of a belt, a shaking pan, and an auger for cleaning by a cleaning system of the harvesting machine.

13. The harvesting machine of claim 12 further comprising a frame defining a window configured to expose the screen to the cut crop moving between the feed accelerator and the pre-threshing device.

14. The harvesting machine of claim 13 further comprising a frame structure configured to support the frame and defining the chamber having an open end configured to direct the pre-threshed grain to a receptacle.

15. The harvesting machine of claim 14 wherein the frame includes a leading lip and a trailing lip, wherein the leading lip is located along the path at a first position and the trailing lip is located along the path at a second position, wherein the second position is located downstream of the first position.

16. The pre-threshing apparatus of claim 12 wherein the pre-threshing device further comprises a screen support structure supporting the screen and the screen includes a plurality of screen structures, wherein adjacent screen structures are offset in height along a dimension generally perpendicular to the flow path.

17. The pre-threshing apparatus of claim 16 wherein two or more of the plurality of screen structures are located on different planes, such that the heights of the screen structures are varied to provide a more complete pre-threshing of grain.

18. A method of harvesting grain with a harvesting machine having a cutting head configured to provide cut crop for threshing with a thresher, the method comprising:

moving the cut crop from the cutting head along a path with a feederhouse chain;

accelerating the cut crop along the path with a feed accelerator located between the feederhouse chain and the thresher;

pre-threshing the cut crop at a gap between the feed accelerator and a pre-threshing device located beneath the feed accelerator to obtain a quantity of pre-threshed grain, wherein the feed accelerator includes a plurality of paddles forming a leading edge directed to the cut crop moving across a screen of the pre-threshing device wherein the screen includes a plurality of screen structures located at different heights;

moving the cut crop to the thresher to continue threshing of the cut crop after pre-threshing the cut crop to obtain a quantity of threshed grain; and separating debris from the cut crop between the feederhouse chain and the feed accelerator, where the debris falls into a debris trap located between the feederhouse chain and the feed accelerator.

19. The method of claim 18 further comprising collecting the quantity of pre-threshed grain at the pre-threshing device.

* * * * *